M. E. N. LUDLOW.
WIND SHIELD.
APPLICATION FILED MAR. 14, 1917.
1,328,383.
Patented Jan. 20, 1920.
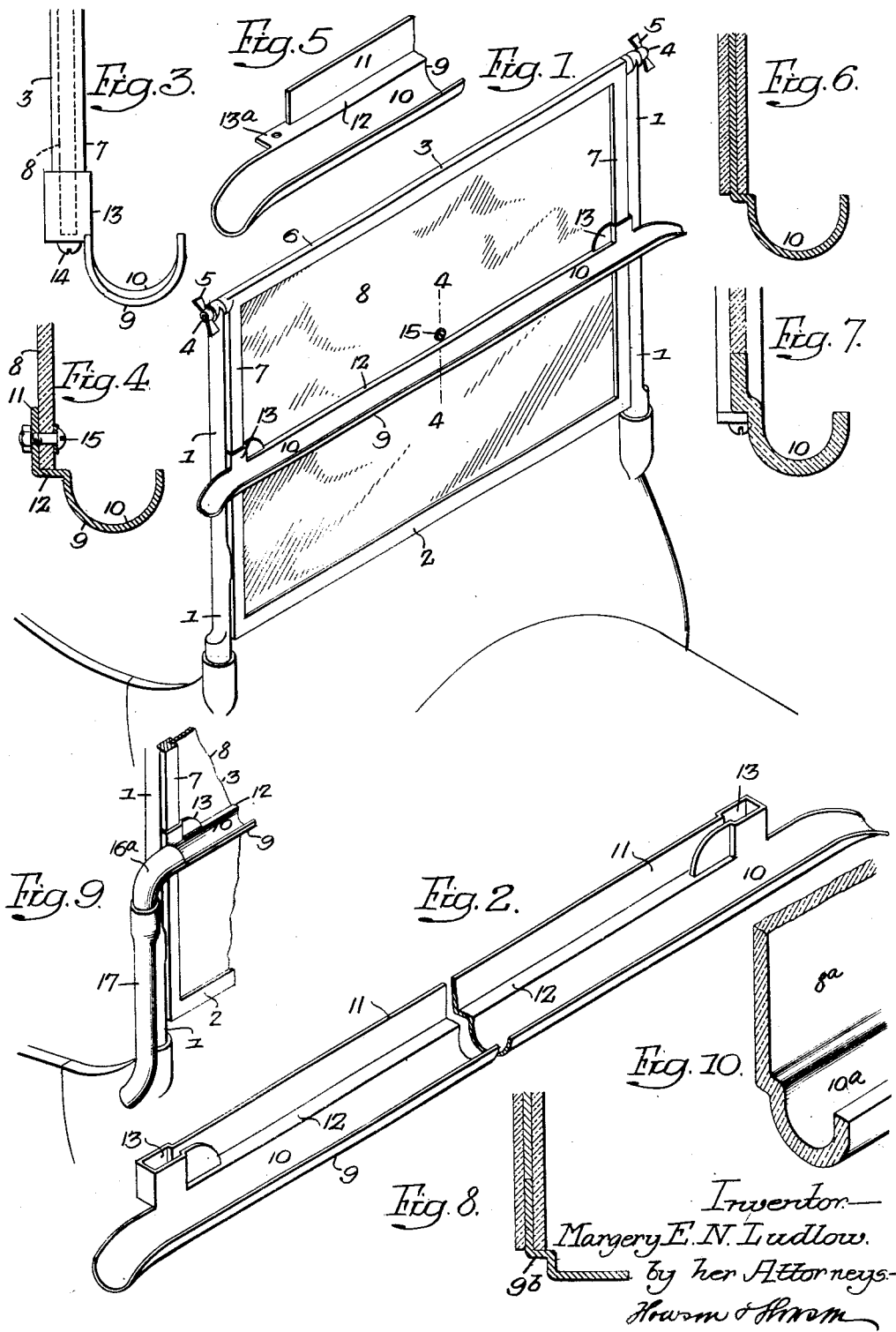
Inventor—
Margery E. N. Ludlow.
by her Attorneys

UNITED STATES PATENT OFFICE.

MARGERY E. N. LUDLOW, OF HAVERFORD, PENNSYLVANIA.

WIND-SHIELD.

1,328,383.  Specification of Letters Patent.  Patented Jan. 20, 1920.

Application filed March 14, 1917. Serial No. 154,789.

*To all whom it may concern:*

Be it known that I, MARGERY E. N. LUDLOW, a citizen of the United States, and a resident of Haverford, county of Montgomery, State of Pennsylvania, have invented certain Improvements in Wind-Shields, of which the following is a specification.

My invention relates to certain improvements in gutters for use in connection with the wind shield of an automobile, so as to prevent the rain water being blown into the car when the upper section of the wind shield is raised to allow for a clear vision.

One object of the invention is to make the gutter of a material which will not interfere with the vision to any appreciable extent.

A further object of the invention is to make the gutter so that it will carry the water to the edge of the wind shield.

A still further object is to so design the gutter that it will hold the glass in the frame, dispensing with the usual clips.

In the accompanying drawings:—

Figure 1, is a perspective view of the wind shield, showing my improved gutter attached thereto;

Fig. 2, is a detached perspective view of the gutter;

Fig. 3, is an end view of the gutter and a portion of the wind shield;

Fig. 4, is a section on the line 4—4, Fig. 1;

Fig. 5, illustrates a modification of the ends of the gutter;

Figs. 6, 7 and 8, are views of different forms of modifications of the gutter;

Fig. 9, is a view showing the means for carrying the water to a point below the wind shield; and Fig. 10, is a sectional view showing the gutter made integral with the glass of the wind shield.

In the drawings, I have illustrated a two-part wind shield in which the lower part is fixed and the upper part is hinged so as to swing to any angle desired.

1 is the frame of the wind shield. 2 is the lower section and 3 is the upper section of the wind shield pivoted at 4 to the frame 1; this section can be adjusted in any position and held by wing nuts 5. The section 3 consists of a frame having an upper bar 6 and side bars 7 grooved to receive the glass 8. The frame of the upper section does not extend, in the present instance, along the lower edge of the glass 8, nor does the frame for the lower section extend along the upper edge of its glass, so that the view is not obstructed. It has been the usual practice to secure clips to the lower ends of each of the side sections 7 of the upper frame which extend under the lower edge of the glass, holding it in position.

9 is the gutter having a channel 10 extending beyond the edges of the wind shield, as clearly shown in Fig. 3, and this gutter has a portion 11 which extends up beyond the side of the glass 8 and is offset at 12 to extend under the edge of the glass, thus aiding in its support. The channel section 10 extends below this offset portion so as to form a wind break to prevent the air passing through the space between the upper and the lower wind shield when the wind shield is closed. At the end of the gutter are pockets 13, which replace the clips now used at the lower edge of the frame 7 to hold the glass 8 in position.

The gutter is held to the frame 7 by screws 14 extending up through the bottom of the gutter and into the frame and by one or more screws 15 which extend through the projecting portion 11 and the glass 8. It will be noticed that each end of the channel portion 10 extends beyond the wind shield so that any water collecting in the gutter will be carried beyond the edge of the wind shield and will not, under ordinary conditions, blow back upon the occupants of the car. In some instances, the end of the channel may be shaped in the form of a tube, as shown at 16ª, and connected to a flexible hose 17, which will carry the water below the body of the car.

I preferably make the gutter parallel with the lower edge of the glass, as I have found that it is not necessary to incline the gutter toward the sides since an automobile is seldom in a level position.

In Fig. 2, as mentioned above, I have shown the gutter provided with pockets 13 for receiving the side members of the frame and, in Fig. 5, I have shown the gutter having a flattened portion 13ª to extend under the frame so that it can be adapted to frames having the ordinary clips.

This gutter is preferably made of transparent celluloid of sufficient thickness that it will be rigid when in place, and, in some instances, the gutter of celluloid may be a continuation of the celluloid sheet placed between the glass in certain types of combination glass plates for wind shields, as shown in Fig. 6, which consists of two sheets of glass with a sheet of celluloid between them.

In Fig. 8, I have shown a strip of celluloid 9b forming the gutter, a portion of this celluloid extending between the two sheets of glass and joining the strip between the glass, the other portion extending beyond the glass and forming the gutter proper, as it will be understood that when the upper section of the wind shield is at an angle sufficient to allow for an uninterrupted vision under the glass, a V-shaped gutter is formed between the glass and the projecting portion. It will be understood that the shape of the gutter may be modified without departing from the essential features of the invention.

In Fig. 7, I have shown a gutter made of glass instead of celluloid and the glass is preferably of the same thickness as the glass of the wind shield and is held against the edge of the glass of the wind shield, and secured in position in any suitable manner.

In Fig. 10, I have shown the gutter 10a forming an integral part of the glass 8a.

By making the gutter in the manner shown in Fig. 4, with a single flange located at the back of the glass and forming an offset at the forward end directly in front of the lower section, I am enabled not only to carry off all of the water which accummulates on the glass section, but also to form a seal between the upper and lower sections of the wind shield when in the closed position. A gutter of this type can be applied to glass of different thicknesses and the flange may be secured to the glass in any suitable manner. In the present instance, I have shown a hole drilled in the glass and a screw bolt extending through the hole and through the flange on the gutter, the ends of the gutter being secured to the frame.

It will be seen by the above construction that I make a transparent gutter, which will not interfere to any appreciable extent with the vision when the wind shield is closed and which will carry the water to either side of the vehicle either in the closed or in the open position. The gutter is of such a length that it will carry the water beyond the wind shield proper so that it will not blow back upon the occupants of the car. Furthermore, by making the gutter in the manner shown, I close the narrow opening between the two sections of the wind shield when the upper portion is in the closed position.

I claim:—

The combination of a wind shield having a pivoted upper section, the upper section consisting of a frame having side members; a sheet of glass located in the side members made in one piece and having pockets at each end to receive the side members and flanged to receive the lower edge of the glass; and a trough section extending the full width of the wind shield structure and beyond the same so as to carry the water away from the wind shield.

In witness whereof I affix my signature.

MARGERY E. N. LUDLOW.